(12) United States Patent
Tran et al.

(10) Patent No.: US 7,388,862 B2
(45) Date of Patent: Jun. 17, 2008

(54) TECHNIQUE FOR NOTIFYING EIGRP NEIGHBORS WHEN DESTROYING ADJACENCIES IN A COMPUTER NETWORK

(75) Inventors: Thuan Van Tran, Raleigh, NC (US); Donnie V. Savage, Raleigh, NC (US); Donald Slice, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 954 days.

(21) Appl. No.: 10/465,129

(22) Filed: Jun. 19, 2003

(65) Prior Publication Data

US 2004/0258002 A1 Dec. 23, 2004

(51) Int. Cl.
H04L 12/28 (2006.01)
(52) U.S. Cl. ...................... 370/389; 370/473
(58) Field of Classification Search ............... None
See application file for complete search history.

(56) References Cited

U.S. PATENT DOCUMENTS 5,461,624 A  10/1995  Mazzola
5,964,841 A  10/1999  Rekhter (Continued)

FOREIGN PATENT DOCUMENTS

WO  WO 02/099447 A1  12/2002

OTHER PUBLICATIONS

"Notification of Transmittal of the International Search Report and the Written Opinion of the International Searching Authority, or the Declaration" for International Application No. PCT/US2004/004615, International Filing Date of Feb. 17, 2004.

"Written Opinion of the International Searching Authority" for International Application No. PCT/US2004/004615, International Filing Date of Feb. 17, 2004.

(Continued)

*Primary Examiner*—Robert W. Wilson
(74) *Attorney, Agent, or Firm*—Cesari and McKenna LLP

(57) ABSTRACT

A technique efficiently notifies EIGRP neighbors when destroying adjacencies in a computer network. A goodbye notification packet is provided that enables an EIGRP router to inform one or more of its neighbors of its intention to destroy their existing adjacencies. The goodbye notification packet comprises an EIGRP packet header with variable-length fields embodied as an appended goodbye attribute. The appended goodbye attribute is illustratively tagged according to a TLV encoding format that defines a new type (T) field called "a goodbye" having a predetermined type that distinguishes it from a conventional EIGRP Hello packet. A value (V) field of information conveyed within the goodbye attribute contains a list of neighbor (peer) identifiers (IDs). The peer IDs on this list instruct those neighbor routers to "go away" so that their adjacencies can be destroyed.

19 Claims, 8 Drawing Sheets

U.S. PATENT DOCUMENTS

| | | | |
|---|---|---|---|
| 6,038,212 | A | 3/2000 | Galand et al. |
| 6,202,114 | B1 | 3/2001 | Dutt et al. |
| 6,314,105 | B1 | 11/2001 | Luong |
| 6,339,595 | B1 | 1/2002 | Rekhter et al. |
| 6,392,997 | B1 | 5/2002 | Chen |
| 6,512,768 | B1 | 1/2003 | Thomas |
| 6,553,423 | B1 | 4/2003 | Chen |
| 6,931,441 | B1 * | 8/2005 | Roden et al. .............. 709/223 |
| 7,126,921 | B2 * | 10/2006 | Mark et al. ................ 370/242 |
| 7,155,536 | B2 * | 12/2006 | Mongazon-Cazavet et al. ......................... 709/242 |
| 2002/0018447 | A1 | 2/2002 | Yamada et al. |

OTHER PUBLICATIONS

Cisco TCT/IP Routing Professional Reference, 2nd Addition, Chapter 4, pp. 104-108 (1999).

Enhanced Interior Gateway Routing Protocol, http://www.cisco.com/warp/public/103/eigrp-toc.html (1992-2003).

* cited by examiner

US 7,388,862 B2

TECHNIQUE FOR NOTIFYING EIGRP NEIGHBORS WHEN DESTROYING ADJACENCIES IN A COMPUTER NETWORK

FIELD OF THE INVENTION

This invention relates generally to computer networks, and more particularly, to destruction of adjacencies between neighboring routers of a computer network.

BACKGROUND OF THE INVENTION

A computer network is a geographically distributed collection of interconnected communication links and subnetworks (subnets) for transporting data between nodes, such as computers. Many types of computer networks are available, with the types ranging from local area networks (LANs) to wide area networks (WANs). A LAN is an example of a subnet that provides relatively short distance communication among the interconnected nodes, whereas a WAN enables long distance communication over links provided by public or private telecommunications facilities. The nodes typically communicate by exchanging discrete frames or packets of data according to predefined protocols. In this context, a protocol consists of a set of rules defining how the nodes interact with each other.

Computer networks may be further interconnected by an intermediate node, called a router, to extend the effective "size" of each network. Since management of a large system of interconnect computer networks can prove burdensome, smaller groups of computer networks may be maintained as routing domains or autonomous systems. The networks within an autonomous system are typically coupled together by conventional intradomain routers. These routers manage communication among local networks within their domains and communicate with each other using an intradomain routing (or an interior gateway) protocol. An example of such a protocol is the Enhanced Interior Gateway Routing Protocol (EIGRP) described in *Cisco TCP/IP Routing Professional Reference*, 2nd Addition, Chapter 4, pgs. 104-108 (1999) and *Enhanced Interior Gateway Routing Protocol.*

The EIGRP protocol is a hybrid of distance vector and link state routing protocol technologies. A distance vector protocol computes a best path to a destination using distance ("cost" or hop count) and vector (the next hop) information. For EIGRP, the distance information is represented as a composite of available bandwidth, delay, load utilization and link reliability information that allows "fine tuning" of link characteristics to achieve optimal (or best) paths. Unlike most link state protocols that maintain information or "state" of the entire network topology, an EIGRP router only maintains state pertaining to reachable neighboring routers. As used herein, neighboring routers (or "neighbors") are two routers that have interfaces to a common network, wherein an interface is a connection between a router and one of its attached networks. The state of each neighbor is stored in a neighbor data structure of the EIGRP router.

An adjacency is a relationship formed between selected neighbors for the purpose of exchanging routing information and abstracting the network topology. One or more router adjacencies may be established over an interface. Adjacencies are generally established, maintained and destroyed through the use of a conventional Hello protocol. Broadly stated, the Hello protocol ensures that communication between neighbors is bi-directional by periodically sending Hello packets out all router interfaces. Two routers become neighbors when they see each other's Hello packets over the common network.

The EIGRP protocol includes a Neighbor Discovery process that routers use to dynamically learn of other routers on their directly attached networks. Routers also use this process to discover when their neighbors become unreachable or inoperative. The Neighbor Discovery process is achieved with low overhead by periodically sending small Hello packets at a rate called the "HelloInterval". The "HoldTime" is the amount of time, i.e., a multiple of the HelloInterval, that an EIGRP router will consider a neighbor alive without receiving a Hello packet. As long as the Hello packets are received from a neighbor within the HoldTime, the EIGRP router determines that the neighbor is alive and functioning; this, in turn, allows both neighbors to exchange (and update) routing information to thereby reach routing convergence. However, if the Hello packets are not received within the HoldTime, the router assumes that the neighbor no longer exists and "tears down" (destroys) the adjacency with the neighbor.

Often, it is desirable for a router to unilaterally decide to destroy an adjacency with its neighbor. In the case of a routing protocol that can maintain adjacencies over point-to-point interface connections, there may be electrical characteristics of the physical connection that disappear when the router "goes away" so that the neighbor can quickly detect that the router is gone. However, there are some point-to-point connection networks that do not provide electrical notification when a neighboring router disappears.

For a routing protocol that maintains adjacencies over multi-access interfaces, such as an Ethernet subnet interface, there are typically no electrical characteristics to inform the neighbors sharing that subnet that their neighboring router has disappeared. One way the router can inform the neighbors of its impending disappearance is to send an unreliable, "terminate" message over the multi-access interface indicating that the router is going away. Routing protocols that have unreliable (e.g., broadcast) capabilities can use this type of terminate mechanism to destroy adjacencies. Yet it is often undesirable to destroy all neighbor adjacencies using such an unreliable mechanism because there may be only a subset of adjacencies that needs terminating.

As noted, another conventional method of detecting neighbor (also referred to as "peer") loss and, subsequently, destroying an adjacency is "time-based" through the absence of communication with the neighbor for a predetermined period of time. As with the case of the EIGRP protocol, it can be assumed that the neighbor no longer exists after expiration of that time period. However, it is also undesirable to assume the delay/latency associated with waiting the entire predetermined period of time, such as the HoldTime, to detect peer loss in order to destroy an existing adjacency. Rather, it is desirable to promptly notify neighbors of an intention to destroy adjacencies so that the adjacencies can be quickly removed, thereby "speeding-up" routing convergence and improving network stability.

SUMMARY OF THE INVENTION

The present invention overcomes the disadvantages of the prior art by providing a technique for efficiently notifying EIGRP neighbors when destroying adjacencies in a computer network. According to the inventive technique, a novel goodbye notification packet is provided that enables an EIGRP router to inform one or more of its neighbors of its intention to destroy their existing adjacencies. The goodbye notification packet comprises an EIGRP packet header with variable-length fields embodied as an appended goodbye attribute. The appended goodbye attribute is illustratively tagged according to a TLV encoding format that defines a new type (T) field called "a goodbye" having a predetermined type that distinguishes it from a conventional EIGRP Hello packet. A value (V) field of information conveyed within the goodbye attribute contains a list of neighbor (or peer) identifiers (IDs). The peer IDs on this list instruct those neighboring routers to "go away" so that their adjacencies can be destroyed.

Operationally, a router issues the goodbye notification packet to one or more neighbors. Upon receiving the goodbye notification packet, each neighbor examines the TLV encoded contents of the appended goodbye attribute. Specifically, the neighbor examines the type field of the novel attribute and, if it is configured to understand that type of information, identifies the packet as a goodbye notification packet. The neighbor then examines the value field of the attribute, searching for its peer ID within the list of peer IDs. Upon discovering its peer ID, the neighbor is instructed to destroy the adjacency with the router, i.e., the source of the goodbye notification packet.

An advantage of the invention is the ability of the goodbye notification packet to operate in both a reliable and an unreliable environment. That is, the goodbye notification packet may function as a reliable message when notifying a neighbor on a point-to-point connection (in a reliable environment) to go away. In addition, the goodbye notification packet may function as an unreliable message in an unreliable environment (shared network media) that notifies a subset of neighbors (through the list of peer IDs) to go away. This aspect of the invention enables scaling of goodbye notification packet, as a single packet can include a list of peer IDs, wherein the list can include one to as many as a maximum number of peer IDs. Only those routers identified by peer IDs proceed to destroy their adjacencies with the source of the goodbye packet. The goodbye packet can further function as a reliable message in an unreliable environment by identifying a single peer ID in the value field of the appended attribute, as well as an unreliable message across an entire shared media subnet.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
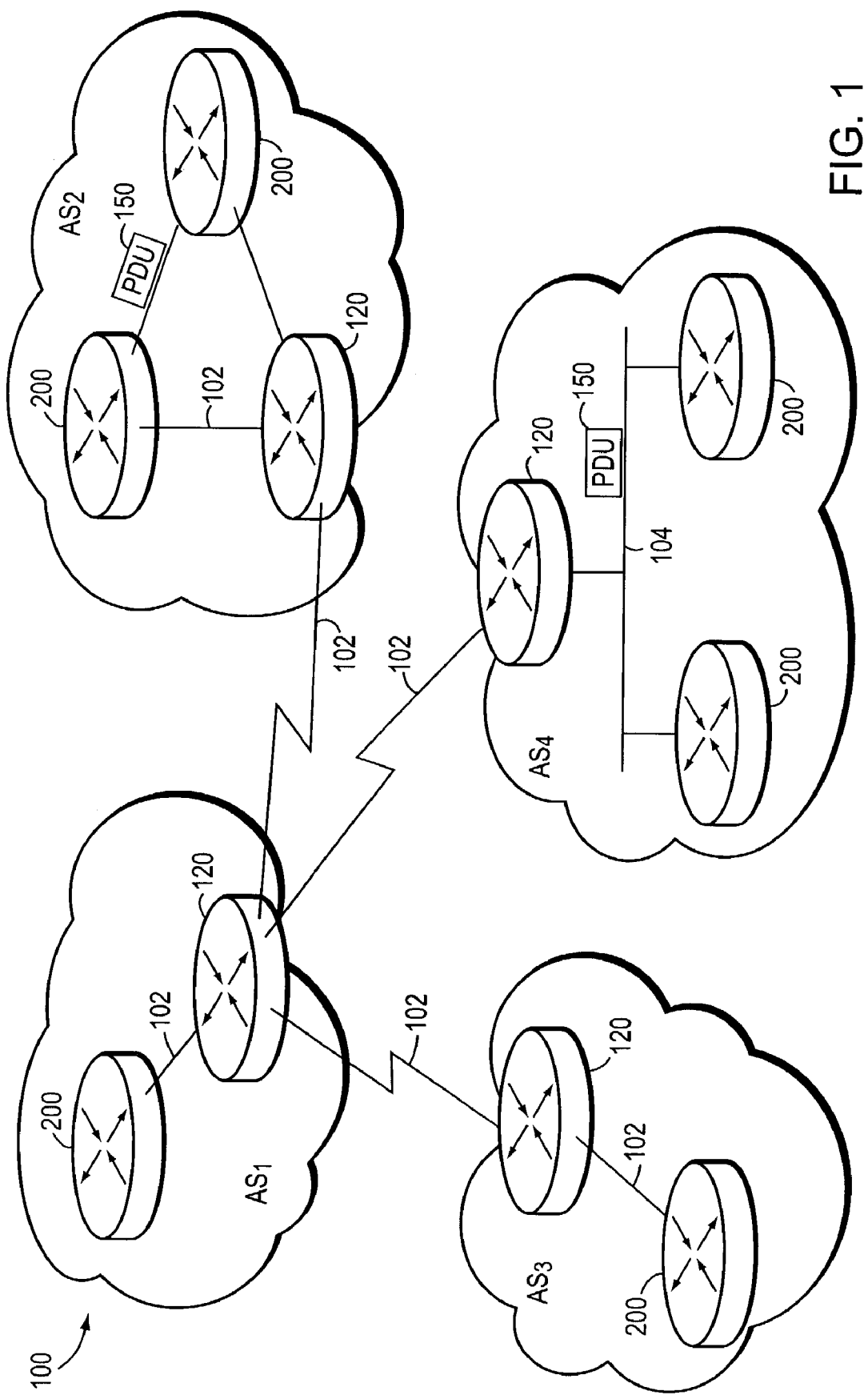
FIG. 1 is a schematic block diagram of a computer network comprising a plurality of autonomous systems including intermediate nodes, such as intradomain routers.

FIG. 1 is a schematic block diagram of a computer network 100 comprising a plurality of routing domains or autonomous systems interconnected by intermediate nodes, such as conventional interdomain routers 120 and intradomain routers 200. The interdomain routers 120 interconnect various autonomous systems ($AS_{1-4}$), whereas the intradomain routers 200 manage communication media and nodes within their respective AS domains. The communication media include shared medium networks 104, such as local area network (LAN) subnetworks, point-to-point links 102 and non-broadcast multi-access (NBMA) clouds such as frame relay or asynchronous transfer node networks. Communication among the routers is typically effected by exchanging discrete protocol data units (PDU 150) or packets in accordance with predefined protocols, such as the Transmission Control Protocol/Internet Protocol (TCP/IP). It will be understood to those skilled in the art that other protocols, such as the Internet packet exchange (IPX) protocol, the Datagram Delivery Protocol (DDP) as well as other link state routing protocols, may be advantageously used with the present invention.

Figure 2:
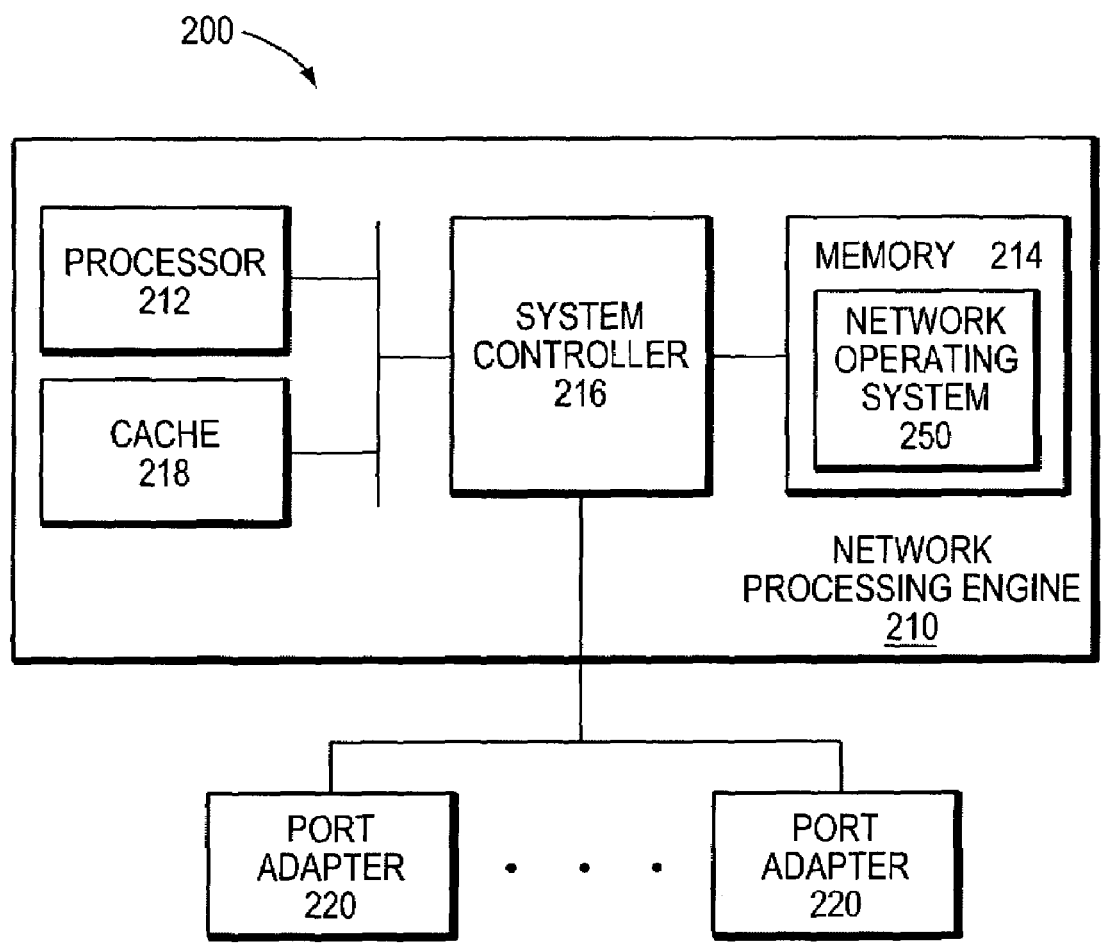
FIG. 2 is a schematic block diagram of a router that may be advantageously used with the present invention.

FIG. 2 is a schematic block diagram of an intradomain router 200. An example of the router 200 that may be illustratively used with the present invention is the 7200 series router available from Cisco Systems, Inc. The router 200 implements a modular and scalable architecture that facilitates use of the router as an edge device for enterprises and service providers. To that end, the router comprises a network processing engine 210 coupled to a plurality of port adapters 220. Each port adapter 220 supports most WAN and LAN technologies and, to that end, comprises circuitry that connects the router to communication media of the network 100.

The network processing engine 210 is a processor-based system comprising functionality incorporated within a typical router. That is, the engine comprises a processor 212 (and cache 218) coupled to a system memory 214 via a system controller 216. The memory 214 may comprise dynamic random access memory (DRAM) and/or synchronous DRAM (SDRAM) storage locations addressable by the processor 212 for storing software programs and data structures, such as tables, packets, etc. A network operating system 250, portions of which are typically resident in memory and executed by the processor, functionally organizes the router by, inter alia, invoking network operations in support of software processes executing on the router. It will be apparent to those skilled in the art that other memory means, including various computer readable media, may be used for storing and executing program instructions pertaining to the operation of the router.

Figure 3:
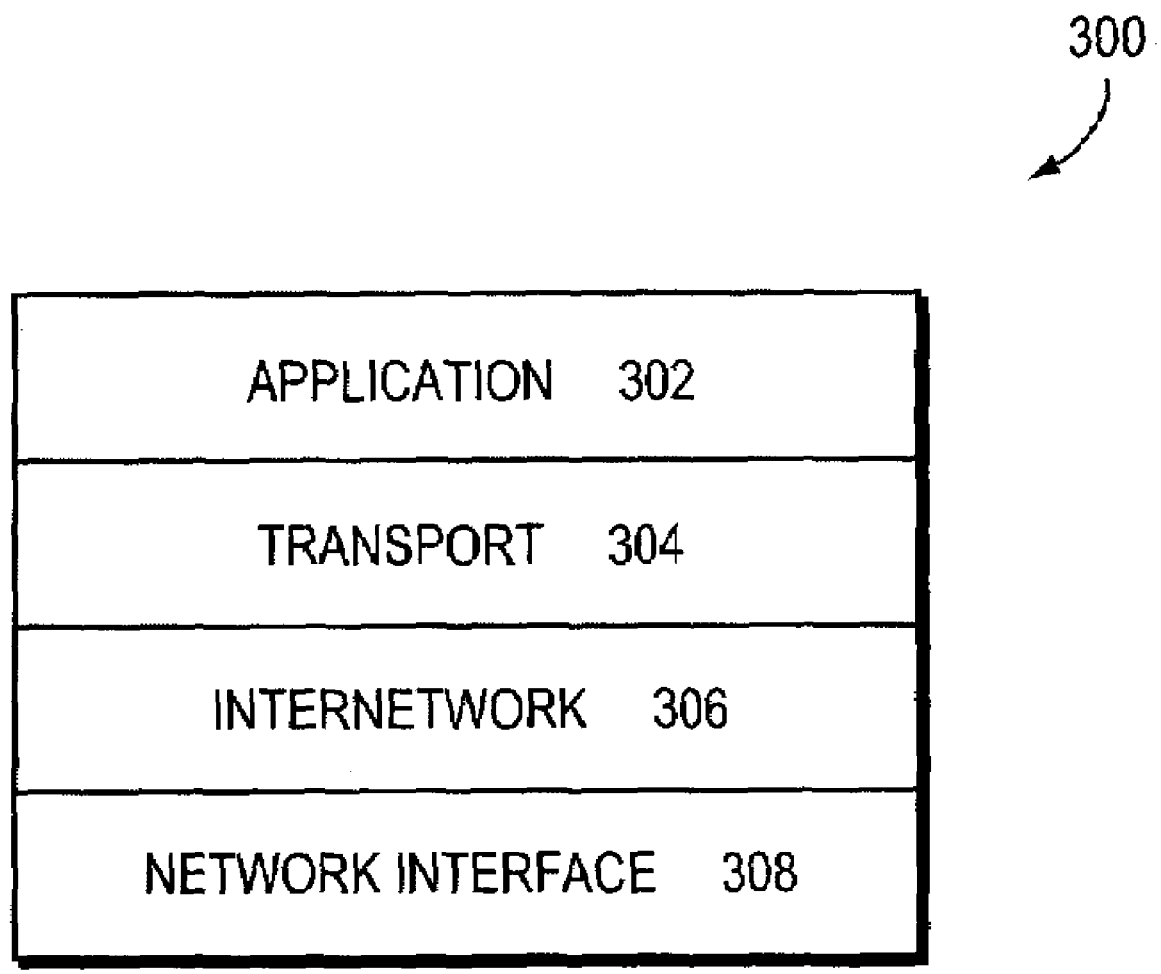
FIG. 3 is a schematic block diagram of a conventional protocol stack, such as the Internet communications protocol stack.

A key function of the router is determining the next node to which a packet is sent; in order to accomplish such "routing" the routers cooperate to determine optimal ("best") paths through the computer network 100. The routing function is preferably performed by a network (internetwork) layer of a protocol stack that, in the illustrative embodiment, is associated with the network operating system 250 of each router. FIG. 3 is a schematic block diagram of a conventional protocol stack, such as the Internet communications protocol stack 300. The architecture of the Internet protocol stack 300 is represented by four layers termed, in ascending interfacing order, the network interface layer 308, the internetwork layer 306, the transport layer 304 and the application layer 302.

The lower network interface layer 308 is generally standardized and implemented in hardware and firmware, whereas the higher layers are typically implemented in the form of software. The primary internetwork layer protocol of the Internet architecture is the Internet protocol (IP). IP is primarily a connectionless protocol that provides internetwork routing, fragmentation and assembly of exchanged packets—generally referred to as "datagrams" in an Internet environment—and which relies on transport protocols for end-to-end reliability. An example of such a transport protocol is the Transmission Control Protocol (TCP) that is implemented by the transport layer 304 and provides connection-oriented services to the upper layer protocols of the Internet architecture. The term TCP/IP is commonly used to denote the Internet architecture.

In particular, the internetwork layer 306 concerns the protocol and algorithms that the routers 200 utilize so that they can cooperate to calculate paths through the computer network 100. An intradomain protocol may be used to perform intradomain routing (for the Internetwork layer) within each AS of the computer network 100. An example of a protocol used to distribute routing information between neighboring routers belonging to a single AS is the Enhanced Interior Gateway Routing Protocol (EIGRP). The EIGRP routing protocol is well known and described in detail in the aforementioned *Cisco TCP/IP Routing Professional Reference, 2nd Addition and Enhanced Interior Gateway Routing Protocol* materials.

The EIGRP protocol is a platform independent protocol comprising a hybrid of distance vector and link state routing protocol technologies. A router configured to run the EIGRP protocol computes a best path to a destination using distance ("cost" or hop count) information represented as a composite of available bandwidth, delay, load utilization and link reliability information that allows "fine tuning" of link characteristics to achieve optimal (or best) paths. The EIGRP router also maintains state pertaining to reachable neighboring routers (or "neighbors") in a neighbor data structure. The reachable neighbors (e.g., other intradomain routers 200 within $AS_{2,4}$ of FIG. 1) are associated with the EIGRP router through an adjacency relationship that enables the exchange of routing information between the neighbors. This adjacency relationship is established and maintained using Hello packets defined by the EIGRP routing protocol.

Figure 4:
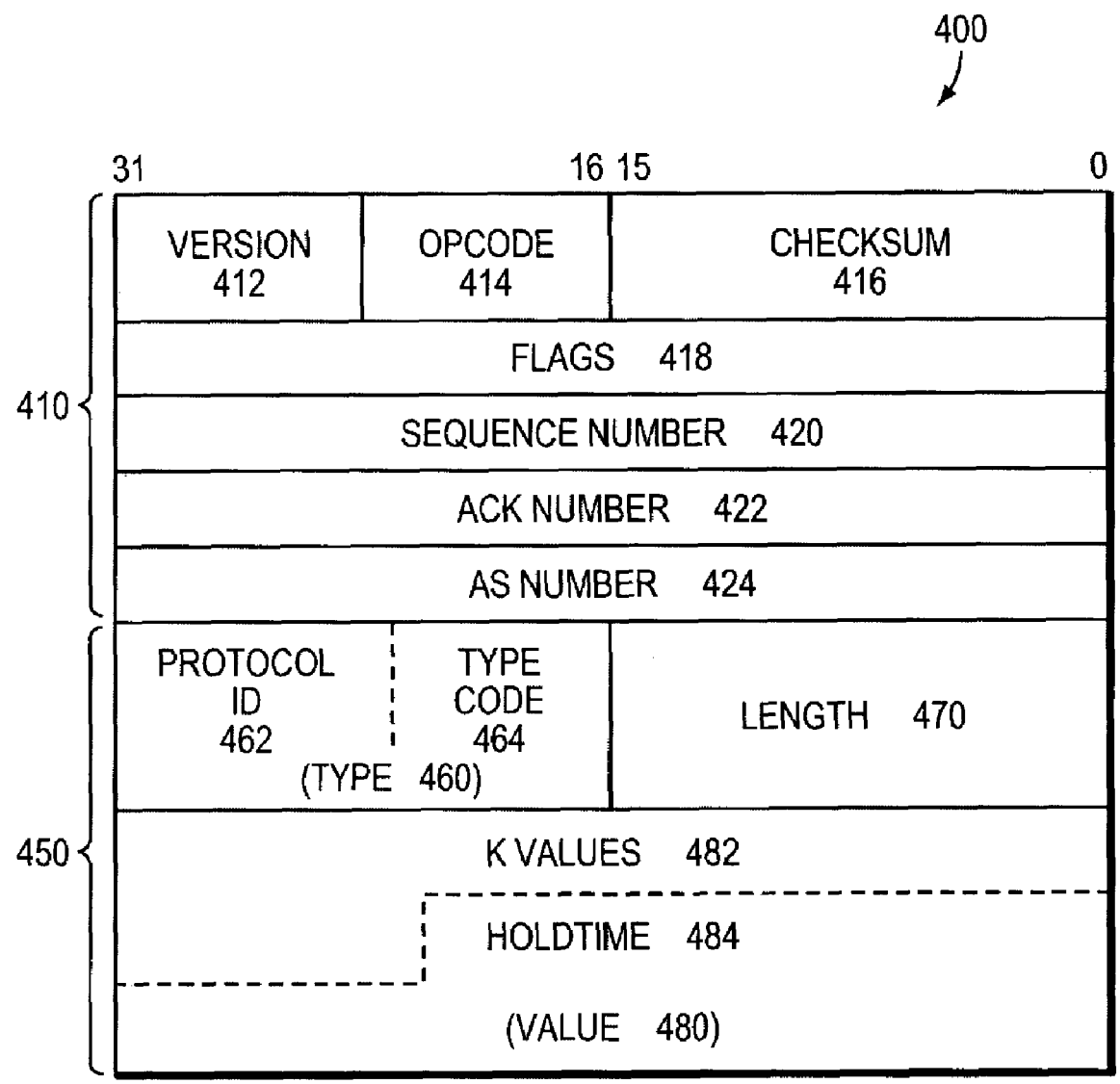
FIG. 4 is a schematic block diagram depicting the format of a Hello packet.

FIG. 4 is a schematic block diagram depicting the format of a Hello packet 400 comprising an EIGRP packet header 410 and Hello-specific variable-length fields 450. EIGRP packets may be encapsulated within various network layer protocols, such as IPX (Novell networks) and DDP (AppleTalk networks); however, in the illustrative embodiment described herein, the EIGRP packets are encapsulated as IP packets (TCP/IP networks). Each EIGRP packet, such as a Hello packet, has a fixed 20-byte EIGRP header 410. The header contains information needed to determine whether the packet should be accepted for further processing. The Hello packet is an EIGRP type 5 packet that is periodically sent over interfaces of the router to establish and maintain neighbor adjacencies. All routers connected to a common network must agree on certain parameters, such as the HoldTime, included in the Hello packet.

The EIGRP packet header 410 includes a version field 412 containing the EIGRP version number, an opcode field 414 containing the type of EIGRP packet and a checksum field 416 that contains a checksum (e.g., standard one's complement of the one's complement sum) for the entire contents of the packet. The header 410 also includes a flags field 418 having a content that defines special handling of the packet and a sequence number field 420 that contains a unique sequence number with respect to a sending router. An ack number field 422 contains an acknowledgement number with respect to a receiver of the packet and an AS number field 424 contains an autonomous system number of the sending system.

Each EIGRP packet may contain a variable number of fields, each of which is tagged in accordance with a type (T), length (L) and value (V) encoding format. These tagged fields allow for newer versions of software to add capabilities and coexist with old versions of software in the same configuration. Fields that are tagged, but that are not recognizable by certain routers can be skipped. This encoding scheme also allows multiple network layer protocols to carry independent information. The Hello-specific variable fields 450 of the EIGRP Hello packet are tagged according to the TLV encoding format.

The Hello-specific variable-length fields 450 include a type field 460 that is structured as a protocol identifier (ID) sub-field 462 containing ID assignments for various supported network layer protocols and a type code sub-field 464. The type code for the Hello packet 400 is illustratively a parameter type (e.g., 0x0001) TLV used to convey EIGRP metric K-values as well as the HoldTime value. The content of length field 470 illustratively specifies the length (in bytes) of the type, length and value fields, while the value field 480 contains the K-values 482 and the HoldTime value 484. Note that the HoldTime is the amount of time (in seconds) that a receiving router should consider the sending neighbor valid. A valid neighbor is a router that is able to forward packets and participate in the EIGRP protocol. Upon considering a neighbor valid, the router stores all routing information advertised by the neighbor.

Figure 5:
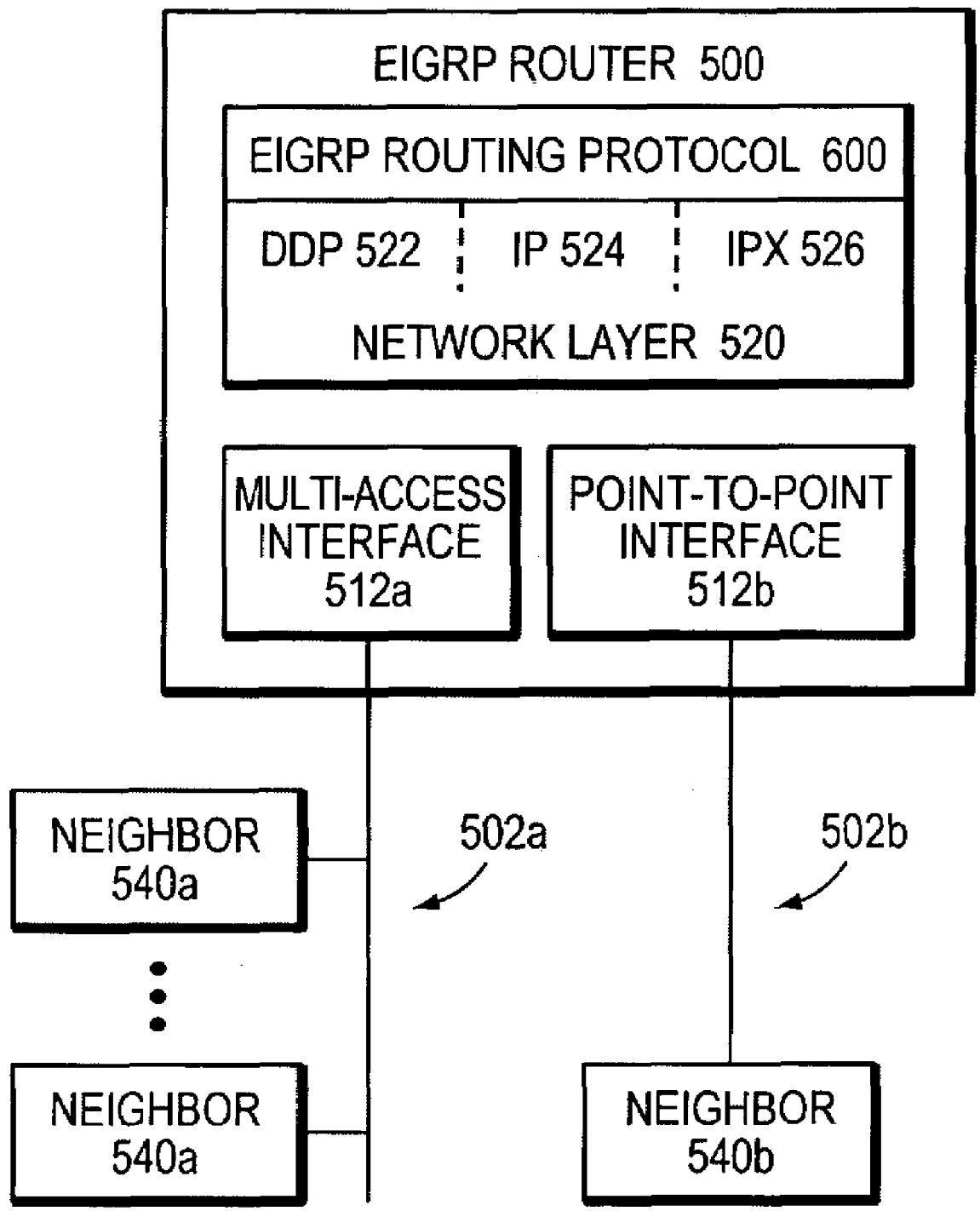
FIG. 5 is a schematic block diagram of an EIGRP router having adjacencies with its neighbors.

FIG. 5 is a schematic block diagram of an EIGRP router 500 having adjacencies 502a,b with its neighbors 540a,b over a multi-access interface 512a and a point-to-point interface 512b of the router. The multi-access interface 512a comprises the electrical, mechanical and signaling circuitry that connects the router to shared media, such as an Ethernet network, whereas the point-to-point interface 512b comprises the circuitry that connects the router to a point-to-point network connection. The router 500 is illustratively an embodiment of router 200 (FIG. 2) and is configured to execute an EIGRP routing protocol process 600 that uses the encapsulation services of its respective supporting network layer 520, e.g., the DDP network layer 522, the IP network layer 524 and/or the IPX network layer 526. The EIGRP process 600 is a component of the network operating system 250, such as the IOS® software available from Cisco Systems, Inc.

Figure 6:
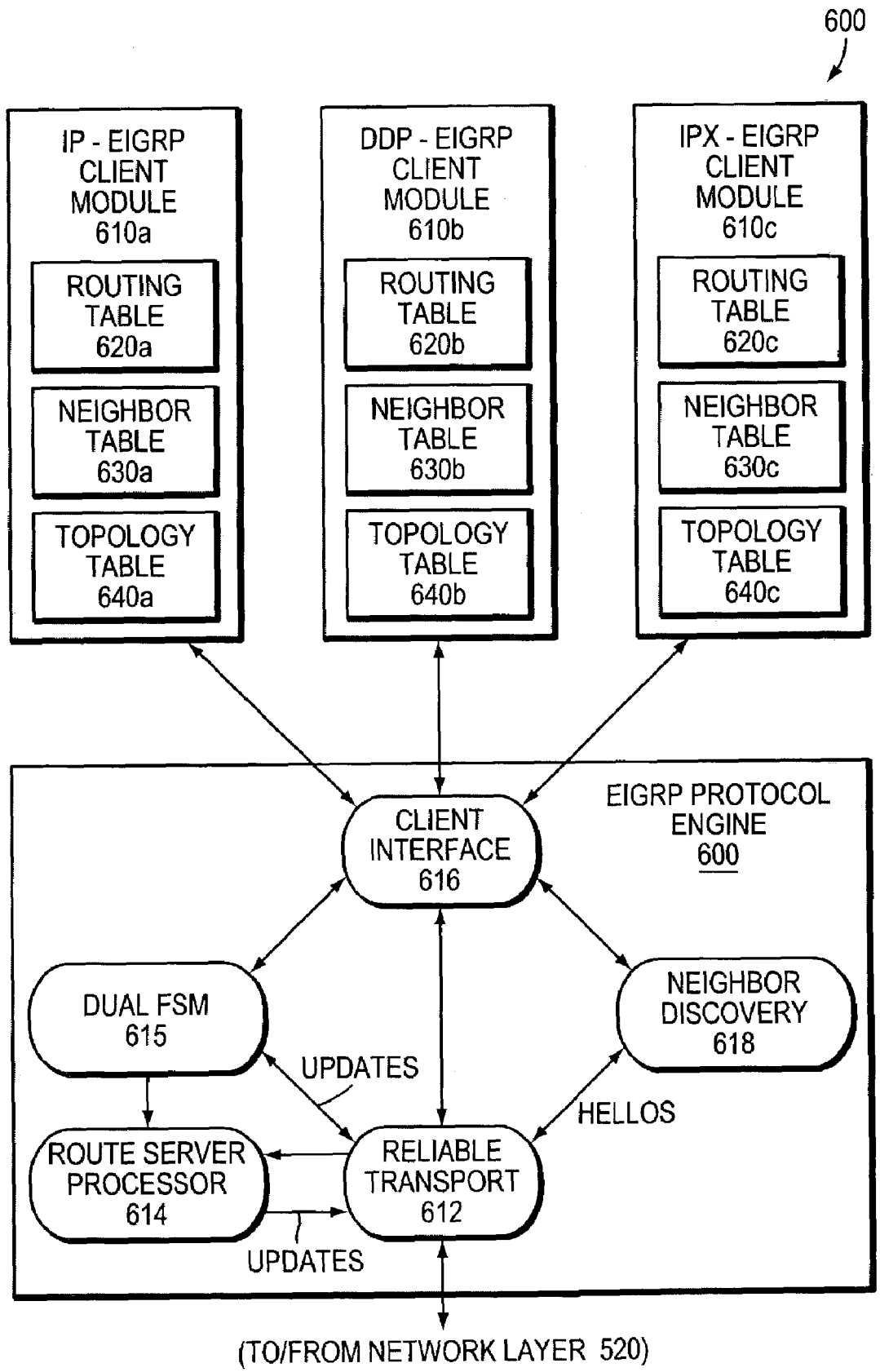
FIG. 6 is a schematic block diagram of an EIGRP routing protocol process that may be advantageously used with the present invention.

FIG. 6 is a schematic block diagram of the EIGRP routing protocol process 600 that may be advantageously used with the present invention. The EIGRP process is illustratively embodied as an EIGRP protocol engine 650 that is responsible for providing general functions for various protocol dependent modules, along with providing reliable transport service, route computations and, notably, neighbor discovery and failure detection. For a multi-protocol implementation, there is a protocol dependent "client" module 610 for each supported network layer 520. For example, an IP-EIGRP client module 610a executes and advertises TCP/IP related routing information for the IP network layer 524. The protocol dependent modules 610 provide network layer specific functions and are responsible for understanding protocol specific packet formats, as well as interfacing with their respective routing tables 620.

The EIGRP protocol engine 650 comprises a number of components, including a Reliable Transport 612, a Route Server Processor 614, a Diffusing Update Algorithm (DUAL) Finite State Machine (FSM) 615, a Client Interface 616 and a Neighbor Discovery process 618. The Reliable Transport 612 is responsible for guaranteed, ordered delivery of EIGRP packets to all neighbors. The DUAL FSM 615 embodies a decision process for all route computations through execution of a DUAL algorithm used to obtain loop-freedom throughout the route computations. The DUAL FSM is responsible for maintaining topology tables 640 that are populated by the protocol dependent modules 610. Each protocol dependent module 610 has a topology table 640 that stores routing information for destinations. The contents of the table 640 are used to determine information that is advertised and inserted into the protocol-specific routing tables 620.

The Neighbor Discovery process 618 is the process used by the EIGRP router 500 to dynamically learn of other routers (neighbors 540) on its directly attached networks. The router 500 also uses process 618 to discover when its neighbors become unreachable or inoperative. The information or state of each adjacent neighbor 540 is stored in a neighbor table 630 maintained by each protocol dependent module 610. When newly discovered neighbors 540 are learned, the address and interface of the neighbor is recorded in the neighbor table 630.

The Neighbor Discovery process 618 is achieved with low overhead by periodically creating and sending small Hello packets 400 at a rate called the "HelloInterval". When EIGRP router 500 is initialized, it starts sending the Hello packets, preferably multicast addressed. Each Hello packet 400 includes the EIGRP metric K-values 482 and a Hold-Time value 484. Once the router 500 detects a new neighbor 540 from receipt of the Hello packet, it sends a reliable (INIT) EIGRP Update packet to the neighbor to initiate topology table exchanges with the new neighbor 540. Upon receiving the INIT update packet, the neighbor 540 detects its peer and proceeds with establishing the adjacency 502 with the EIGRP router 500.

The "HoldTime" is the amount of time that an EIGRP router will consider a neighbor alive without receiving a Hello packet 400. In the illustrative embodiment, the HelloInterval is preferably 5 seconds and the HoldTime is 15 seconds. As long as the Hello packets are received from a neighbor within the HoldTime, the EIGRP router determines that the neighbor is alive and functioning; this, in turn, allows both neighbors to exchange (and update) routing information to thereby reach routing convergence. However, if the Hello packets are not received within the HoldTime, the router assumes that the neighbor no longer exists and "tears down" (destroys) the adjacency with the neighbor.

Often, it is desirable for the EIGRP router 500 to unilaterally decide to destroy the adjacency 502 with its neighbor 540. One method of detecting neighbor (peer) loss and, subsequently, destroying an adjacency is "time-based" through the absence of communication with the neighbor for a predetermined period of time. For example if Hello packets are not received from the neighbor 540 within the HoldTime, the EIGRP router 500 assumes that the neighbor no longer exists and "tears down" (destroys) the adjacency 502 with the neighbor. However, it is also undesirable to assume the delay/latency associated with waiting the entire predetermined time period, such as the HoldTime, to detect peer loss in order to destroy an existing adjacency. Rather, it is desirable to promptly notify neighbors of an intention to destroy adjacencies so that the adjacencies can be quickly removed, thereby "speeding-up" routing convergence and improving network stability.

Figure 7:
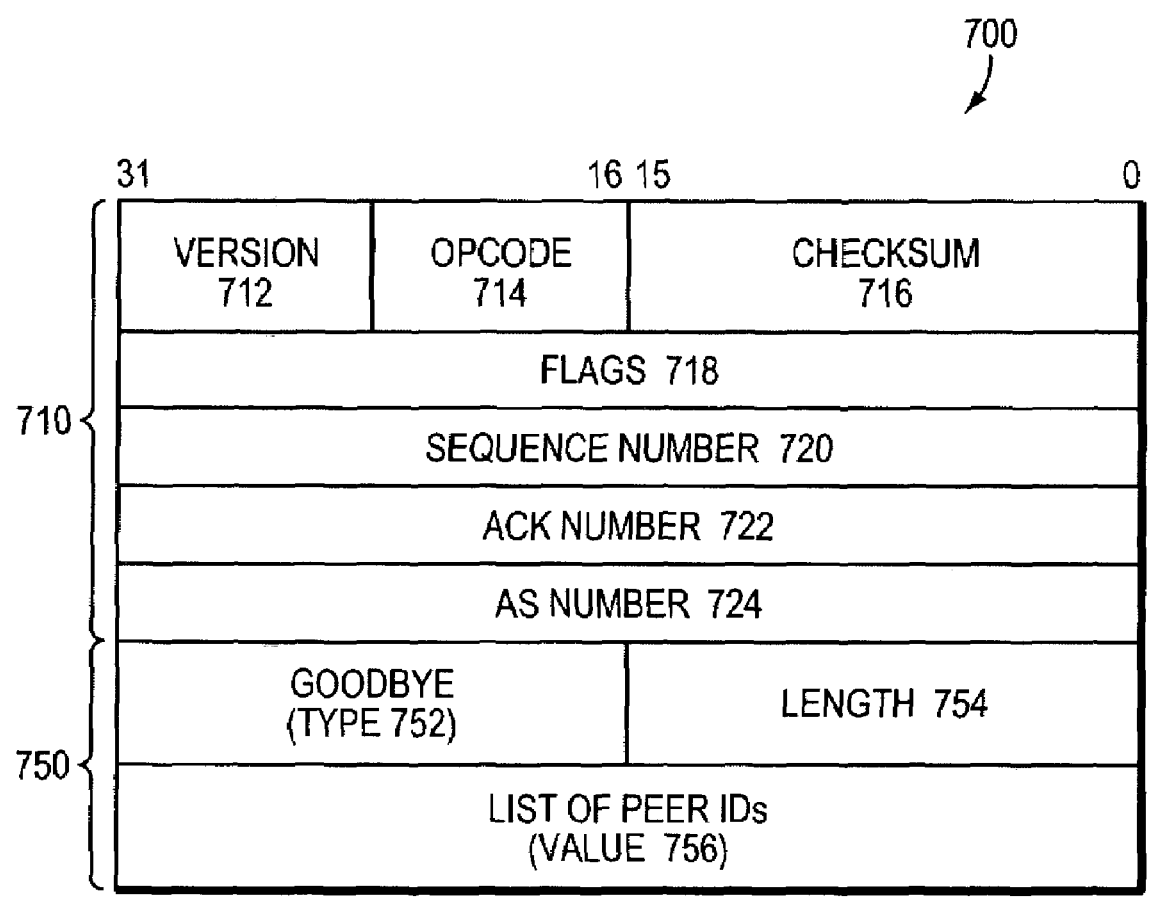
FIG. 7 is a schematic block diagram of a goodbye notification packet according to the present invention.

The present invention relates to a technique for efficiently notifying EIGRP neighbors when destroying adjacencies in a computer network. According to the inventive technique, a novel goodbye notification packet is provided that enables an EIGRP router, such as router 500, to inform one or more of its neighbors 540 of its intention to destroy their existing adjacencies 502. FIG. 7 is a schematic block diagram of the goodbye notification packet 700 comprising an EIGRP packet header 710 with variable-length fields embodied as an appended goodbye attribute 750. The goodbye attribute 750 is illustratively tagged according to a type (T), length (L) and value (V) encoding format.

The TLV encoding format is a generic way to communicate information between two systems or nodes, such as routers, where the information may not be entirely known to one router. The TLV is used to identify a type (T) of information being conveyed, a length (L) of information to be conveyed and a value (V) of the actual information conveyed. An advantage of a TLV-based communication system is that a router can skip over any type of information that it is not configured to "understand". That is, using the length (L) parameter, the router can skip an attribute (TLV) it doesn't understand, until it finds a TLV for which it is configured. The length (L) parameter is implementation-specific and can denote the length from the beginning of the first field of the attribute to the end. However, the length generally denotes the length of the value (V) field and not the type field or length field.

The EIGRP packet header 710 is similar to the EIGRP packet header 410 (FIG. 4) and, thus, includes a version field 712 containing the EIGRP version number, an opcode field 714 containing the type of EIGRP packet and a checksum field 716 that contains a checksum (e.g., standard one's complement of the one's complement sum) for the entire contents of the packet. A flags field 718 has a content that defines special handling of the packet and a sequence number field 720 contains a unique sequence number with respect to a sending router. An ack number field 722 contains an acknowledgement number with respect to a receiver of the packet and an AS number field 724 contains an autonomous system number of the sending system. In addition, the goodbye attribute 750 defines a new type (T) field 752 called "a goodbye" having a predetermined type (e.g., 0x0007) that distinguishes it from a conventional EIGRP Hello packet. A value (V) field 756 contains a list of neighbor (peer) IDs, wherein each peer ID is a conventional identifier, such as an address, of a router. A neighbor whose peer ID appears on the peer ID list is instructed to initiate a "peer down" action to destroy its adjacency with the EIGRP router 500.

The peer IDs of neighbors that will have their adjacencies destroyed are stored on, e.g., a queue of interface 512 in router 500. When scheduled to run, the Neighbor Discovery process 618 examines the queue and constructs goodbye notification packets 700 using the peer IDs. The list of peer IDs contained in each goodbye notification packet 700 can include one to as many as a maximum number of peer IDs. Multiple goodbye notification packets 700 may be used if there are more peer IDs than can be carried in field 756 of a single packet 700.

Destruction of an adjacency can be on an interface basis, such that EIGRP router 500 may destroy all neighbor adjacencies 502 on one interface, but none of the adjacencies on the other interfaces. However, it is possible to destroy only one adjacency on an interface, e.g., multi-access interface 512a, such as when changing a parameter between the router 500 and a neighbor 540a. For example, the router might change authentication or some type of security information between a neighbor and itself. Here, the router wants to restart only that neighbor's relationship over with the new security information, while continuing to run different security information for the other neighbors.

Figure 8:
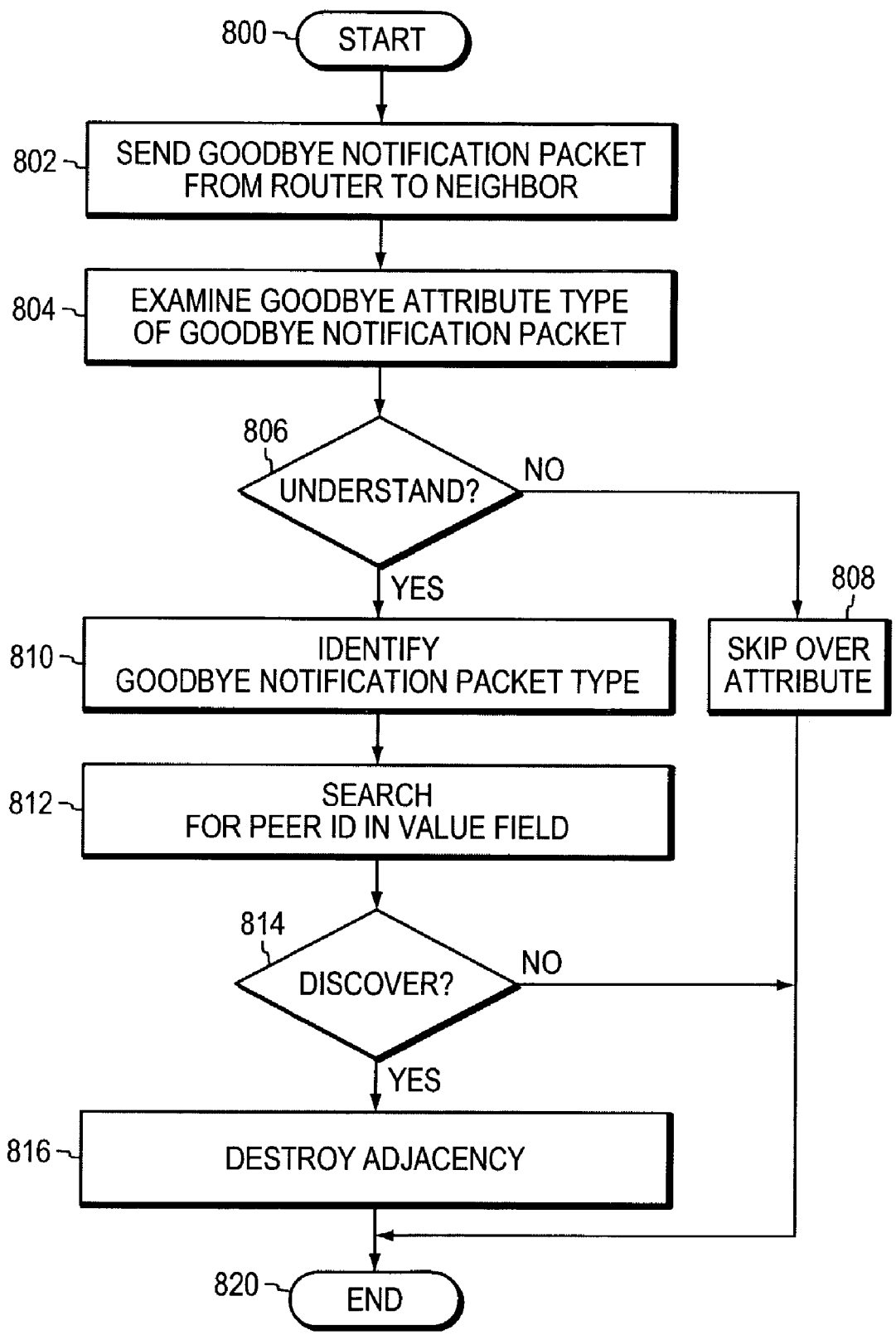
FIG. 8 is a flowchart illustrating a sequence of steps when using the goodbye notification packet according to the present invention.

FIG. 8 is a flowchart illustrating a sequence of steps when using the goodbye notification packet according to the present invention. The sequence starts at Step 800 and proceeds to Step 802 where a router, such as EIGRP router 500, sends the goodbye notification packet 700 to one or more neighbors 540. Upon receiving the goodbye notification packet, each neighbor 540 examines the TLV encoded contents of the appended goodbye attribute 750 in Step 804. Specifically, the neighbor examines the type field of the novel attribute to determine if it is configured to understand that type of information (Step 806). If not, the neighbor skips over the attribute in Step 808 and the sequence ends at Step 820. However, if the neighbor is configured to understand the type of information, it identifies the packet type as a goodbye notification packet in Step 810. The neighbor then examines the value field of the attribute, searching for its peer ID within the list of peer IDs in Step 812. If the neighbor does not discover its peer ID (Step 814), the sequence ends at Step 820. Otherwise if it does discover its peer ID, the neighbor destroys the adjacency with the source of the goodbye notification packet (router 500) in Step 816 and the sequence ends at Step 820.

An advantage of the invention is the ability of the goodbye notification packet to operate in both a reliable and an unreliable environment. That is, the goodbye notification packet may function as a reliable message when notifying a neighbor on a point-to-point connection (in a reliable environment) to "go away", i.e., destroy its adjacency with the source of the packet (an EIGRP router). In addition, the goodbye notification packet may function as an unreliable message in an unreliable environment (shared network media) that notifies a subset of neighbors (through the list of peer IDs) to destroy their adjacencies with the EIGRP router. This aspect of the invention enables scaling of goodbye notification packet, as a single packet can include a list of peer IDs, wherein the list can include one to as many as a maximum number of peer IDs. Only those routers identified by peer IDs proceed to destroy their adjacencies with the source of the goodbye packet. The goodbye packet can further function as a reliable message in an unreliable environment by identifying a single peer ID in the value field of the appended attribute, as well as an unreliable message across an entire shared media subnet.

There are various network situations that will benefit from the novel goodbye notification technique such as, for example, when there is a one-way failure on a link between two neighbors. Here, one router detects the failure and removes the adjacency, while the other router still receives packets and maintains the adjacency. In the absence of the goodbye notification technique, the adjacency is eventually destroyed in both routers, but only because of retransmission timeouts or a stuck-in-active condition.

Another network situation involves failure of unreliable delivery service, leaving only reliable delivery as an option. When unreliable delivery fails, the adjacency between two routers is typically destroyed due to expiration of the HoldTime. However, in the absence of the goodbye technique, EIGRP reliable traffic effectively resets the HoldTime that, in turn, maintains the adjacency. In addition, when a user reloads router 500 or removes the EIGRP routing protocol process 600, the goodbye notification packet(s) enable notification of all of the router's neighbors 540 so that they can quickly destroy their adjacencies with the router and discover alternate routes. Similarly, when an EIGRP configured interface is "shutdown", use of the goodbye technique enables fast and efficient notification to all neighbors.

While there has been shown and described an illustrative embodiment for efficiently notifying EIGRP neighbors when destroying adjacencies in a computer network, it is to be understood that various other adaptations and modifications may be made within the spirit and scope of the present invention. For example, in an alternate embodiment, an EIGRP router 500 may employ the Hello packet 400 as a "wildcard goodbye packet" to destroy the adjacencies of all neighbors 540 coupled to an interface, such as multi-access interface 512a. Here, all K-values 482 contained in value field 480 of the Hello-specific variable-length fields 450 are set to invalid constants (e.g., 255). In addition, a new goodbye flag (e.g., goodbye_all_peers) is provided for the flags field 418 of EIGRP header 410. When the goodbye flag is set, the Neighbor Discovery process 618 stops sending goodbye notification packets 700 to individual neighbors (if any) and sends only one wildcard goodbye packet on the interface. This embodiment of the invention provides backward compatibility and simplicity in processing. If a neighbor 540a running an older version of the EIGRP protocol receives the wildcard goodbye packet with the invalid K-values, it immediately tears down the adjacency with the router 500. Moreover, the wildcard goodbye packet is understood at the protocol dependent modules 610 rather than relying on protocol specific code to decipher a protocol specific wildcard address.

The foregoing description has been directed to specific embodiments of this invention. It will be apparent, however, that other variations and modifications may be made to the described embodiments, with the attainment of some or all of their advantages. For instance, it is expressly contemplated that the teachings of this invention, including the various modules described herein, can be implemented as software, including a computer-readable medium having program instructions executing on a computer, hardware, firmware, or a combination thereof. In addition, it is understood that the data structures described herein can include additional information while remaining within the scope of the present invention. Furthermore, the inventive goodbye notification technique may apply to any protocol that maintains peering information (state), including non-routing protocols, such as wireless protocols running on wireless devices that have wireless connections between them. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system configured to notify neighbors when destroying adjacencies in a computer network, the system comprising:
   a router configured to generate a goodbye notification packet to inform one or more of the neighbors to destroy the adjacencies, the goodbye notification packet having a packet header with an appended goodbye attribute tagged according to an encoding format;
   wherein adjacencies are relationships formed between selected routers for ex-changing routing information.

2. The system of claim 1 wherein the router is an enhanced interior gate-way routing protocol (EIGRP) router configured to run an EIGRP routing protocol process.

3. The system of claim 2 wherein the EIGRP routing protocol process comprises a neighbor discovery process configured to construct the goodbye notification packet.

4. The system of claim 1 wherein the router comprises:
a multi-access interface with circuitry that connects the router to a shared media computer network; and
a point-to-point interface with circuitry that connects the router to a point-to-point computer network connection.

5. The system of claim 4 wherein the multi-access interface enables use of the goodbye notification packet as an unreliable message in an unreliable environment to notify a subset of neighbors to destroy their adjacencies with the router.

6. The system of claim 5 wherein the subset of neighbors is notified through the list of peer IDs.

7. The system of claim 4 wherein the point-to-point interface enables use of the goodbye notification packet as a reliable message in a reliable environment to notify a single neighbor to destroy its adjacency with the router.

8. The system of claim 7 wherein the single neighbor is notified through the list of peer IDs.

9. A method for notifying neighbors when destroying adjacencies in a computer network, the method comprising the steps of:
sending a goodbye notification packet from a router to one or more of the neighbors to inform the neighbors to destroy the adjacencies, the goodbye notification packet having a packet header with an appended goodbye attribute;
examining the appended goodbye attribute at each neighbor;
in response to the neighbor being configured to understand the goodbye attribute, searching a list of peer identifiers (IDs) contained in the goodbye attribute for the peer ID of the neighbor, and in response to the peer ID of the neighbor being on the list, destroying the adjacency with the router.

10. The method of claim 9 wherein the step of examining comprises the step of examining a type of the goodbye attribute to determine the neighbor is configured to understand that type of information.

11. The method of claim 10 further comprising the step of, in response to the neighbor not being configured to understand the goodbye attribute, skipping over a value field of the goodbye attribute.

12. The method of claim 11 wherein the neighbors are routers configured to run an Enhanced Interior Gateway Routing Protocol (EIGRP).

13. A system configured to notify neighbors when destroying adjacencies in a computer network, the system comprising:
a router configured to run an enhanced interior gateway routing protocol (EIGRP) to generate a goodbye notification packet to inform one or more of the neighbors to destroy the adjacencies, the goodbye notification packet having a packet header with an appended goodbye attribute having a predetermined goodbye type and a list of neighbor (peer) identifiers (IDs), wherein each neighbor identified by a peer ID on the list destroys the adjacency with the router.

14. Apparatus configured to notify neighbors when destroying adjacencies in a computer network, the apparatus comprising:
means for sending a goodbye notification packet from a router to one or more of the neighbors to inform the neighbors to destroy the adjacencies, the goodbye notification packet having a packet header with an appended goodbye attribute;
means for examining the appended goodbye attribute at each neighbor;
means for, in response to the neighbor being configured to understand the goodbye attribute, searching a list of peer identifiers (IDs) contained in the goodbye attribute for the peer ID of the neighbor, and in response to the peer ID of the neighbor being on the list, destroying the adjacency with the router.

15. The apparatus of claim 14 wherein the means for examining comprises means for examining a type of the goodbye attribute to determine the neighbor is configured to understand that type of information.

16. The apparatus of claim 15 further comprising:
means for, in response to the neighbor not being configured to understand the goodbye attribute, skipping over a value field of the goodbye attribute.

17. A computer readable medium containing executable program instructions for notifying neighbors when destroying adjacencies in a computer network, the executable program instructions comprising program instructions for:
sending a goodbye notification packet from a router to one or more of the neighbors to inform the neighbors to destroy the adjacencies, the goodbye notification packet having a packet header with an appended goodbye attribute;
examining the appended goodbye attribute at each neighbor;
in response to the neighbor being configured to understand the goodbye attribute, searching a list of peer identifiers (IDs) contained in the goodbye attribute for the peer ID of the neighbor, and in response to the peer ID of the neighbor being on the list, destroying the adjacency with the router.

18. The computer readable medium of claim 17 wherein the program instruction for examining comprises one or more program instructions for examining a type of the goodbye attribute to determine the neighbor is configured to understand that type of information.

19. The computer readable medium method of claim 18 further comprising one or more program instructions for, in response to the neighbor not being configured to understand the goodbye attribute, skipping over a value field of the goodbye attribute.

* * * * *